(12) United States Patent
Nelson et al.

(10) Patent No.: US 9,573,355 B2
(45) Date of Patent: Feb. 21, 2017

(54) METHOD AND APPARATUS FOR CONTOURING COMPOSITE PRE-PREG ARTICLES

(71) Applicants: Paul E. Nelson, University Place, WA (US); Peter D. McCowin, Enumclaw, WA (US); Worm Lund, Bellevue, WA (US)

(72) Inventors: Paul E. Nelson, University Place, WA (US); Peter D. McCowin, Enumclaw, WA (US); Worm Lund, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 14/310,219

(22) Filed: Jun. 20, 2014

(65) Prior Publication Data

US 2015/0246522 A1  Sep. 3, 2015

Related U.S. Application Data

(62) Division of application No. 13/223,188, filed on Aug. 31, 2011, now Pat. No. 8,794,957, and a division of application No. 11/769,082, filed on Jun. 27, 2007, now Pat. No. 8,118,959.

(51) Int. Cl.
*B32B 38/00* (2006.01)
*B29C 33/30* (2006.01)
(Continued)

(52) U.S. Cl.
CPC ........ *B32B 38/0012* (2013.01); *B29C 33/308* (2013.01); *B29C 43/10* (2013.01);
(Continued)

(58) Field of Classification Search
CPC .... B29C 2043/3626; B29C 2043/3644; B29C 2043/3647; B29C 33/308;
(Continued)

(56) References Cited

U.S. PATENT DOCUMENTS 2,868,264 A   1/1959  Jones
3,417,601 A   12/1968 Werner
(Continued)

FOREIGN PATENT DOCUMENTS

EP   1393873 A2   3/2004

*Primary Examiner* — Christopher Schatz
(74) *Attorney, Agent, or Firm* — Felix L. Fischer

(57) ABSTRACT

A forming tool and method for its use with flat pre-preg composite laminate assemblies which incorporates a mandrel segmented into multiple forming blocks, the forming blocks sized to receive a draped composite laminate assembly with all portions of the composite laminate assembly spaced from a shaping surface on each block. A spline plate engages the shaping surface of the forming blocks to provide a neutral axis for maintaining the entire composite laminate assembly in tension during forming. In the exemplary embodiments, the draped composite laminate assembly is formed to the forming blocks from the flat composite laminate assembly and maintained in contact with the forming blocks using a vacuum bag. The mandrel forming blocks arc then displaced to a desired curvature on the spline plate.

7 Claims, 19 Drawing Sheets

(51) Int. Cl.
  *B29C 43/10* (2006.01)
  *B29C 43/36* (2006.01)
  *B29C 70/44* (2006.01)
  *B29C 70/46* (2006.01)

(52) U.S. Cl.
  CPC .......... *B29C 43/3642* (2013.01); *B29C 70/44* (2013.01); *B29C 70/46* (2013.01); *B29C 2043/3626* (2013.01); *B29C 2043/3644* (2013.01); *B29C 2043/3647* (2013.01); *B32B 2038/0028* (2013.01); *Y10T 156/1028* (2015.01); *Y10T 156/1041* (2015.01); *Y10T 156/1043* (2015.01)

(58) Field of Classification Search
  CPC ..... B29C 43/10; B29C 43/3642; B29C 70/44; B29C 70/46; B32B 37/10; B32B 37/1018
  USPC ....... 156/196, 212, 221, 285, 381, 219, 220; 264/544, 552, 553, 571; 425/387.1, 388, 425/518
  See application file for complete search history.

(56) References Cited

U.S. PATENT DOCUMENTS

| | | |
|---|---|---|
| 4,475,976 A | 10/1984 | Mittlestadt et al. |
| 5,266,137 A | 11/1993 | Hollingsworth |
| 5,546,784 A | 8/1996 | Haas et al. |
| 5,648,109 A | 7/1997 | Gutowski et al. |
| 6,355,133 B1 | 3/2002 | Williams |
| 7,118,370 B2 | 10/2006 | Willden et al. |
| 2006/0108055 A1 | 5/2006 | Pham |
| 2006/0216480 A1 | 9/2006 | Weidmann et al. |
| 2006/0231981 A1 | 10/2006 | Lee |

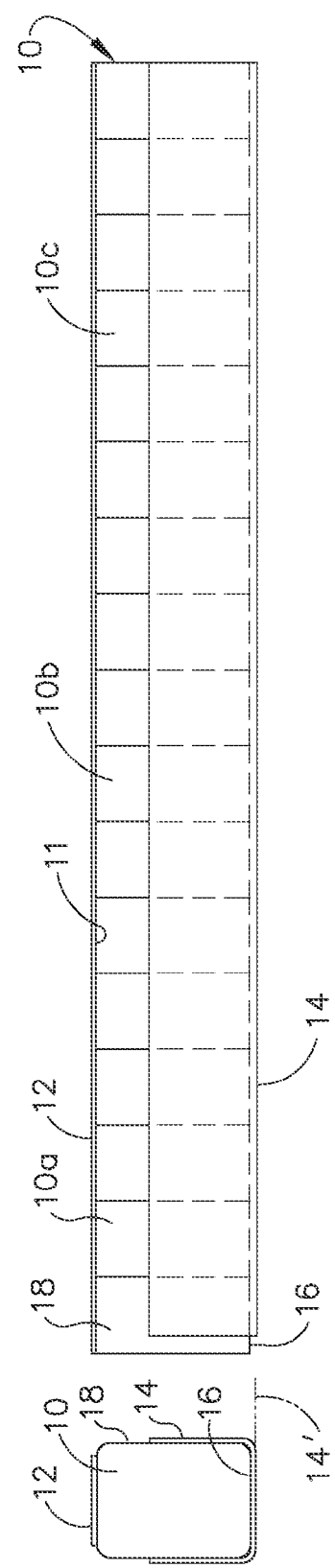

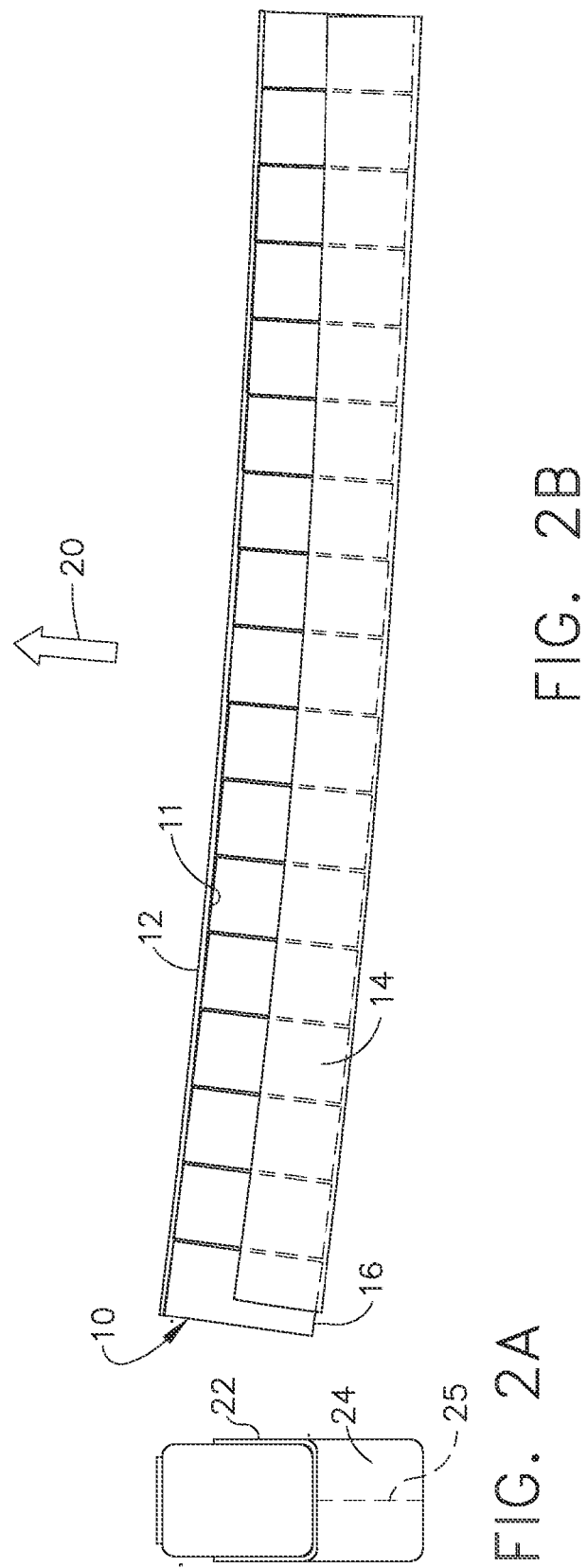

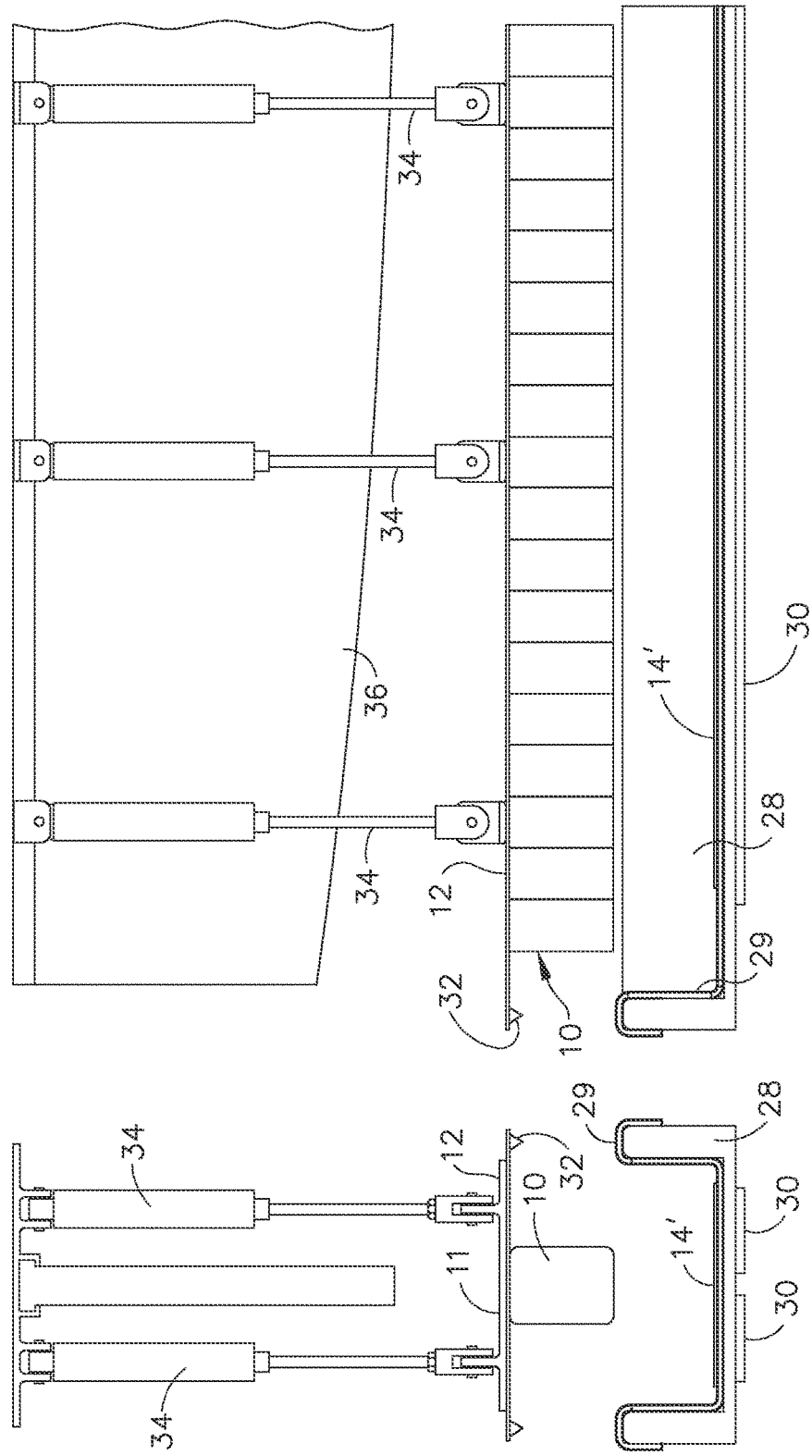

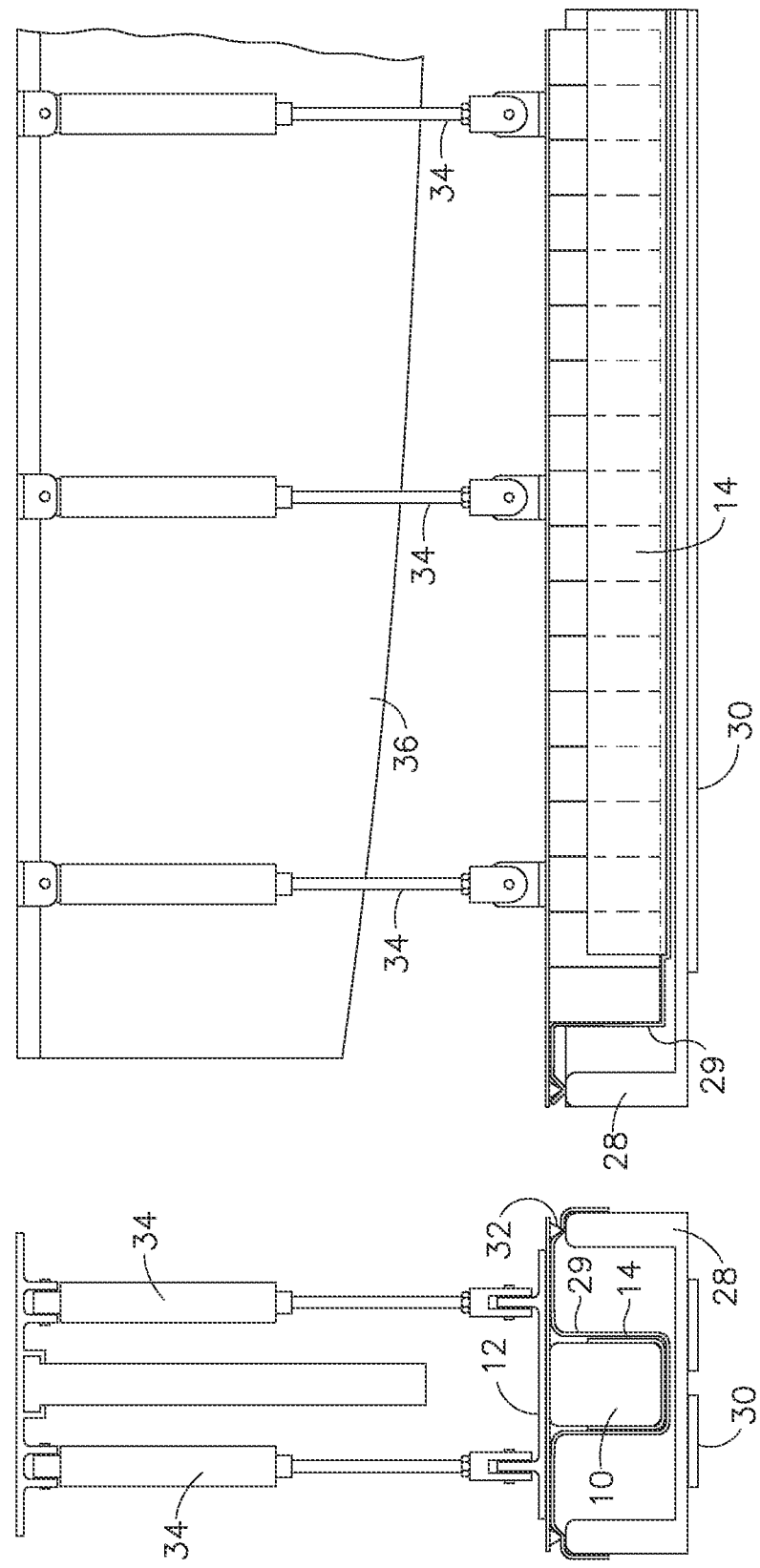

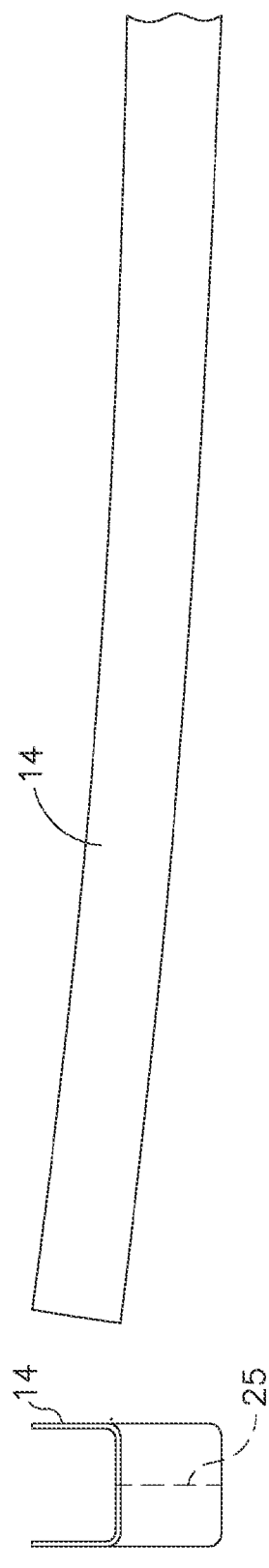

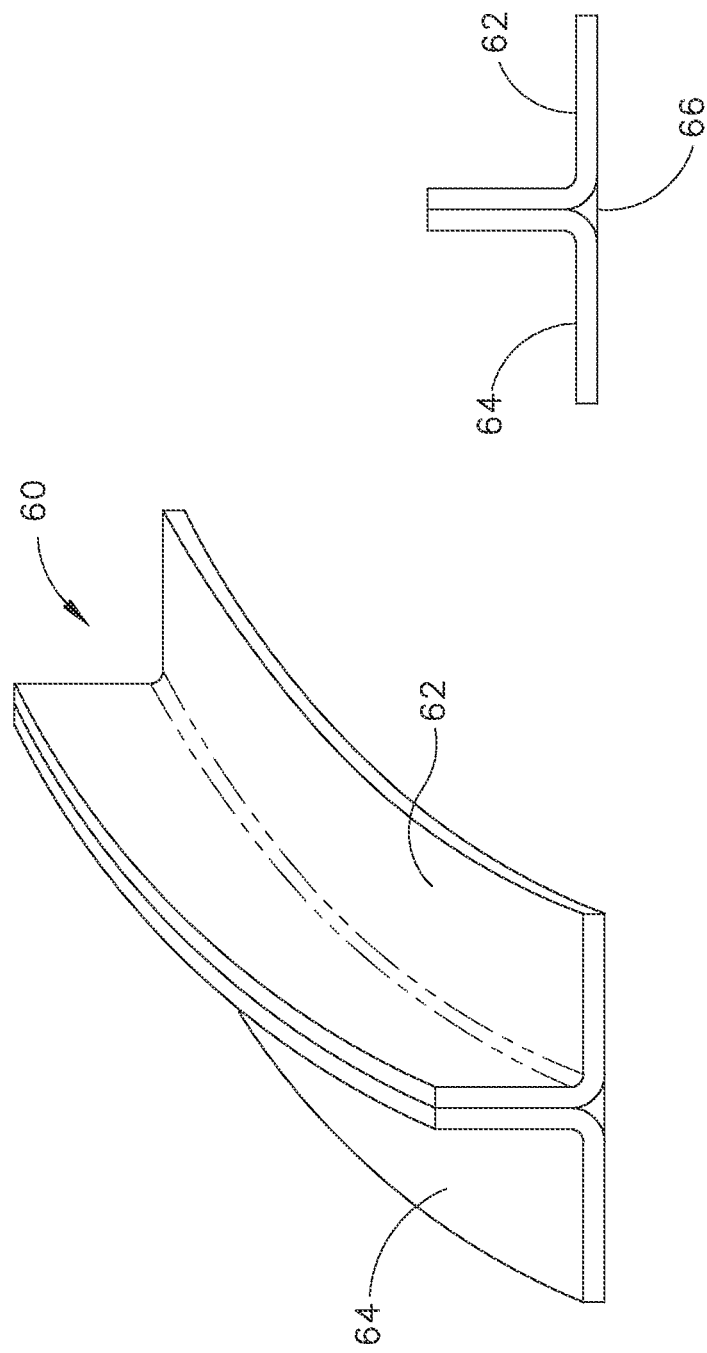

METHOD AND APPARATUS FOR CONTOURING COMPOSITE PRE-PREG ARTICLES

REFERENCE TO RELATED APPLICATIONS

This application is a divisional application of U.S. patent application Ser. No. 13/223,188 filed on Aug. 31, 2011 which is a divisional application of U.S. patent application Ser. No. 11/769,082 filed on Jun. 27, 2007 both entitled METHOD AND APPARATUS FOR CONTOURING COMPOSITE PRE-PREG ARTICLES having common inventors and a common assignee with the present application, the disclosures of which are incorporated herein by reference.

BACKGROUND INFORMATION

1. Field

This invention relates generally to the forming of composite structures and more particularly to a forming method and tooling for single or multiple axis forming of a flat epoxy pre-impregnated laminate (pre-preg) charge using a flexible mandrel maintaining the entire cross section of the mandrel and part under tension during the curve forming operation.

2. Background

Replacement of machined, cast, forged or stamped metallic structural elements such as aluminum wing ribs, in an aerospace industry example, with composite structures is becoming highly desirable for weight reduction and performance enhancement of structural assemblies. For the composite wing rib example, without limitation, ribs may be similar to built-up aluminum ribs, using separate webs, chords and stiffeners. All of the parts may be produced primarily from epoxy pre-impregnated composite tape which typically is placed manually on a predetermine shaped mandrel followed by curing within an autoclave.

The two fundamental approaches presently in the art are to assemble composite laminate onto a tooling form in a predetermined manner in its final shape on the cure mandrel, or assemble in a predetermined manner a flat charge of composite laminate, mechanically form it to shape, and then cure it.

Forming of composite elements which have variable contour with local areas having a contour as tight as 300 inch radius currently requires manual layup on a shaped mandrel. At a typical rate of one pound per hour per employee, manual laminate assembly of the large structural elements is not an economical approach for full production applications. Automated lay-up of composite structural elements directly on cure mandrels is possible with modified fiber placement machines. However, such an approach requires specific machine development with associated very high capital investment.

It is therefore desirable to assemble in a predetermined manner flat composite laminate assemblies or charges and form them to shape. Flat charges are typically manufactured using composite tape automation methods and these machines are very cost effective at producing flat charges. Capability is readily available with current manufacturing processes to drape form flat charges to a channel shape on a flexible mandrel and then cure the mandrel. However, this process is suitable for large radius bends only. At radii of 1500 inches or less, there may be problems of causing buckles in the pre-preg composite laminate assembly.

It is also therefore desirable to provide a method and tooling for shaping and cure of flat charge layups of pre-preg materials with single or multiple centers of curvature which precludes buckling of composite assembly.

SUMMARY

The embodiments disclosed herein provide a forming tool and method for its use with flat impregnated laminate assemblies or charges which incorporate a mandrel segmented into multiple forming blocks, the forming blocks sized to receive a draped composite laminate assembly with all portions of the composite laminate assembly spaced from a shaping surface on each block. A spline plate engages the shaping surface of the forming blocks. In the exemplary embodiments, the draped composite laminate assembly is formed to the forming blocks from the flat composite laminate assembly and maintained in contact with the forming blocks using a vacuum bag. The mandrel forming blocks are then displaced to a desired curvature. The curvature is induced by employing the spline plate in a saddle onto which the segmented mandrel is placed, Upon relaxation of the segmented forming blocks in the mandrel onto the saddle, the desired curvature is induced.

In one embodiment providing multiple axis forming, the mandrel is segmented into a plurality of contiguously mounted forming blocks sized to receive a draped composite laminate assembly with all portions of the composite laminate assembly spaced from a first shaping surface and a second shaping surface on each block. The mandrel incorporates a cable restraining the forming blocks on a neutral axis with protuberances for the second shaping surface to offset the neutral axis. A saddle tool has a first spline plate with a first center of curvature receiving the first shaping surface of the forming blocks and a second spline plate with a second center of curvature receiving the second shaping surface on the second spline plate. A vacuum bag maintains the draped composite laminate assembly in contact with the forming blocks and a relaxable tensioning cable urges the forming blocks into mutual contact in a first tensioned condition for initially receiving the draped composite laminate assembly. The tension cable is then relaxed to a released condition allowing the forming blocks to expand to a desired curvature on the spline plates of the saddle tool.

BRIEF DESCRIPTION OF THE DRAWINGS

These and other features and advantages of the embodiments of the disclosure will be better understood by reference to the following detailed description when considered in connection with the accompanying drawings wherein:

FIG. 1A is an end view of an embodiment of a flexible mandrel with spline plate and a flat Composite laminate assembly formed over a mandrel cross-section;

FIG. 1B is a side view of the embodiment of FIG. 1A;

FIG. 2A is an end view of the embodiment of FIG. 1A after flexing of the mandrel and spline plate;

FIG. 2B is a side view of the flexed embodiment of FIG. 2A;

FIG. 3A is an end view of exemplary support tooling for operation of the flexible mandrel with spline plate showing initial insertion of a flat composite laminate assembly;

FIG. 3B is a side midline section view of the exemplary tooling and composite laminate assembly of FIG. 3A;

FIG. 4A is an end view showing the draped composite laminate assembly supported by the vacuum bag on the mandrel;

FIG. 4B is a side semi-section view of the supported draped composite laminate assembly of FIG. 4A;

FIG. 10A is an end view of the cured composite laminate assembly showing the symmetrical part line;

FIG. 10B is a partial side view of the cured composite laminate assembly;

FIG. 12A is an isometric view of an alternative exemplary composite structural assembly;

FIG. 12B is a section view of the composite structural assembly FIG. 12A;

DETAILED DESCRIPTION

Figure 5B:
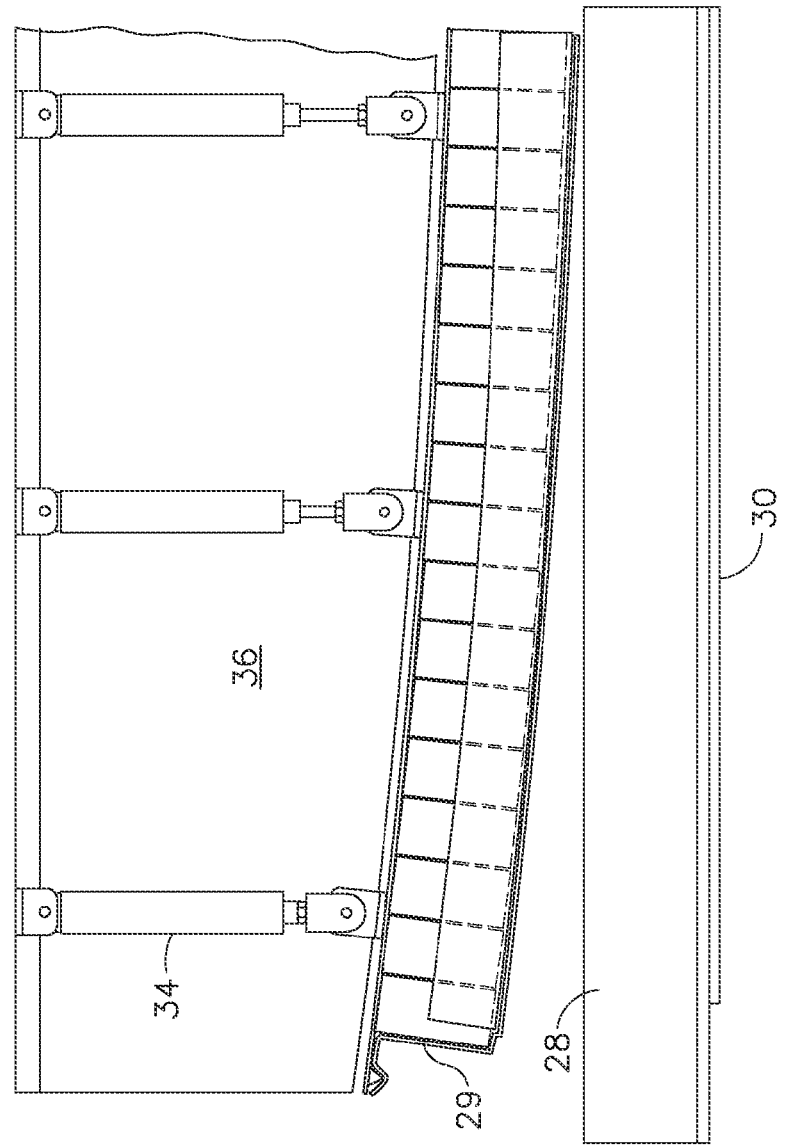
FIG. 5B is a side semi-section view of the formed composite laminate assembly of FIG. 5A.

The embodiments described herein employ a segmented flexible mandrel receiving a flat composite laminate assembly for shaping and engaging a spline plate displaced from the composite laminate assembly radially inward with respect to the center of curvature and providing a neutral axis to maintain the entire composite laminate assembly in tension during shaping. FIG. 1A shows in end view the mandrel 10 engaging a spline plate 12 with a flat composite laminate assembly 14 (shown in its initial configuration in phantom 14') engaging the outer surface 16 of the mandrel and draped around sides 18 of the mandrel as will be described in greater detail subsequently. The composite laminate assembly for the embodiment shown is for forming rib cords in an aircraft structure. For the embodiment shown, the layup has interrupted zero plies to assist in forming. FIG. 1B shows in side view the composite laminate assembly extending around the side surface of the mandrel which is segmented into forming blocks (with exemplary segments labeled as elements 10a, 10b and 10c) engaging the spline plate.

FIGS. 2A and 2B show the mandrel in a formed position about a center of curvature designated by direction arrow 20. The radius of curvature shown in the drawing is constant but for alternative embodiments varies along the length of the segmented mandrel with collections of segments forming varying radii of curvature. The exemplary rib cord web 22 and flange 24 can be seen with a part line 25 for left hand and right hand parts. As shown in the figures, the spline plate is displaced inward from all elements of the draped composite laminate assembly contacting the forming blocks on a shaping surface 11 and providing a neutral axis. The mandrel segments expand in response to the curvature of the spline plate maintaining the entire composite laminate assembly in tension for forming.

FIGS. 3A and 3B show an exemplary first embodiment of a support and forming tooling for the mandrel 10 and spline plate 12 and a method for forming the desired composite parts will be described beginning with these figures. A tray 28 is employed to receive the flat composite laminate assembly 14' which has been laid up with the desired ply structure using Flat Tape Laminating Machine (FTLM), composite laminating machine or Composite Spar and Stringer Reciprocating Laminator (CSSRL) or similar lay up machines known in the art. An elastomeric sheet 29 is draped into the tray 28 prior to inserting the flat composite laminate assembly for use as will be described in greater detail subsequently. Strip heaters 30 are attached to the tray bottom for heating of the flat composite laminate assembly in the tray thereby reducing total resin system viscosity within the composite assembly to facilitate conformal forming of the flat laminate. The spline plate 12 extends beyond the lateral extent of the mandrel forming blocks and incorporates pyramid seals 32 which compressively engage downward on the elastomeric sheet 29 as a vacuum seal. Movable actuators in the form of retractable support rods 34 are mounted to the spline plate and a cord contour tool 36 provides a surface contour for matching to the spline plate 12 to impart the desired contour. While a contour tool is employed in the embodiment shown, alternative embodiments may employ a greater number of support rods at closer spacing with a thicker spline plate to directly impart the contour to the plate.

The flat composite laminate assembly 14' is heated to forming temperature using the strip heaters 30 and the mandrel 10 is lowered (or alternatively, the tray is raised) to engage the composite laminate assembly on the outer surface 16 of the mandrel as shown in FIGS. 4A and 4B. Vacuum is drawn urging the Elastomeric sheet 29 to adopt the contour of the mandrel 10 draping the flat composite laminate assembly 14 onto the sides of the mandrel 10.

Figure 5A:
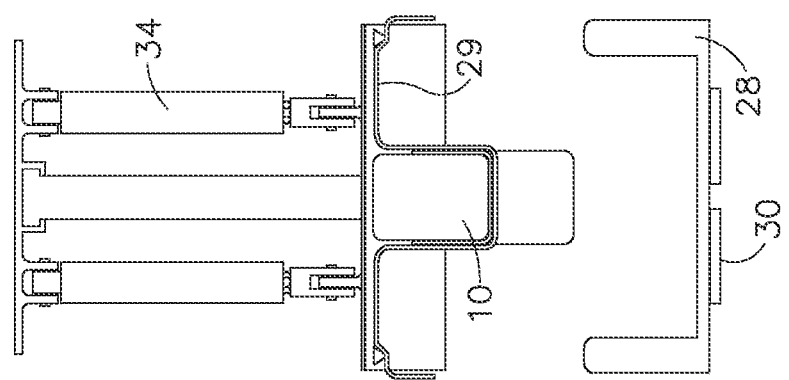
FIG. 5A is an end view showing the formed composite laminate assembly.

The mandrel 10 is then lifted from the tray 28 by retraction of the support rods 34 which also engages the spline plate 12 with the contour tool 36 as shown in FIGS. 5A and 5B. The individual segments or forming blocks (10a, 10b as exemplary) of the mandrel displace in a manner consistent with the induced curvature of the spline plate forming the composite laminate assembly 14 which is held in place by the evacuated elastomeric sheet. Alternative curvatures are obtained by use of different contour tools or for the embodiment described employing actuators only by programming the retraction length of the various actuators to achieve the desired curvature of the spline plate.

Figure 6:
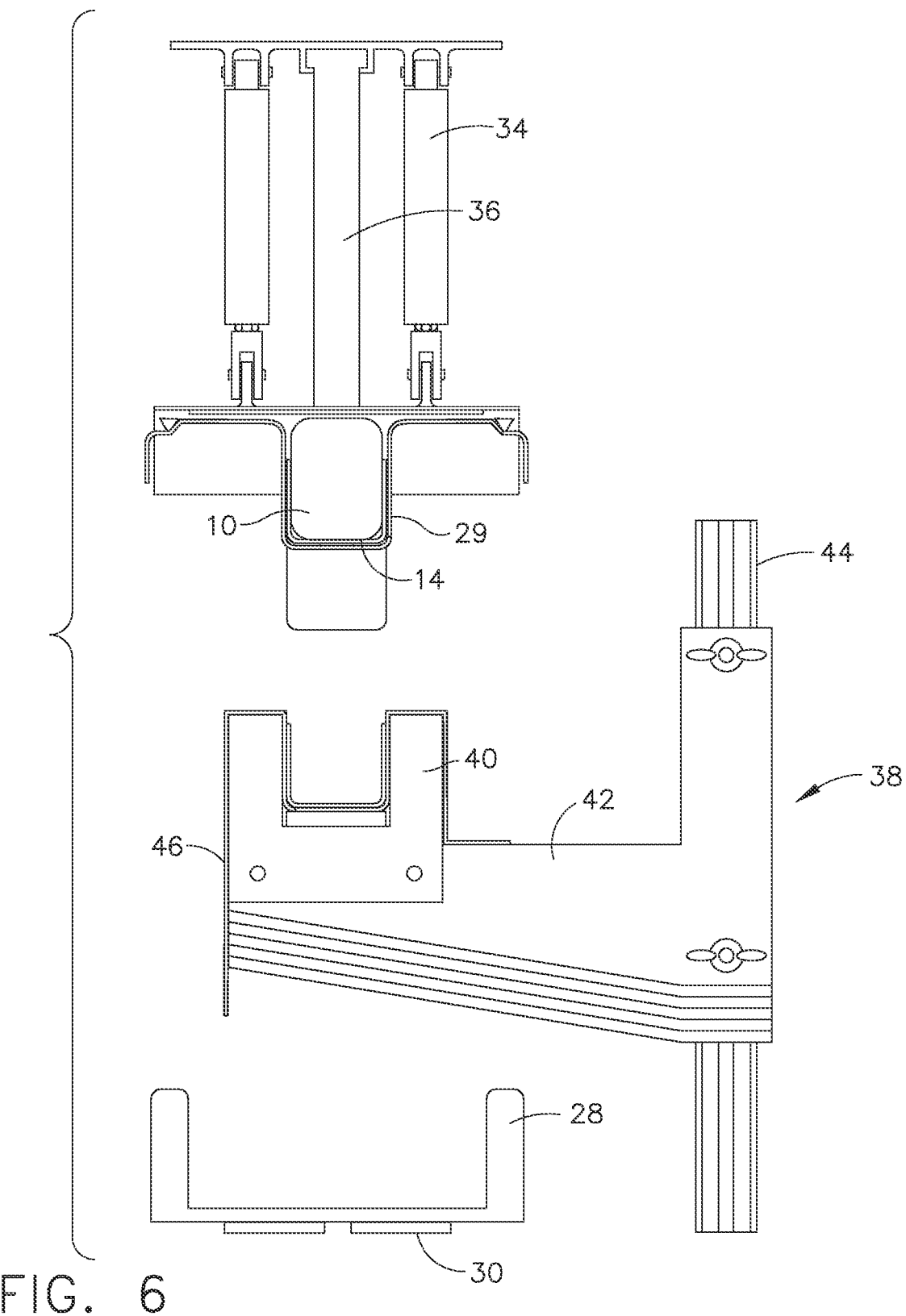
FIG. 6 is an end view of the transfer tool receiving the formed composite laminate assembly.
Figure 7:
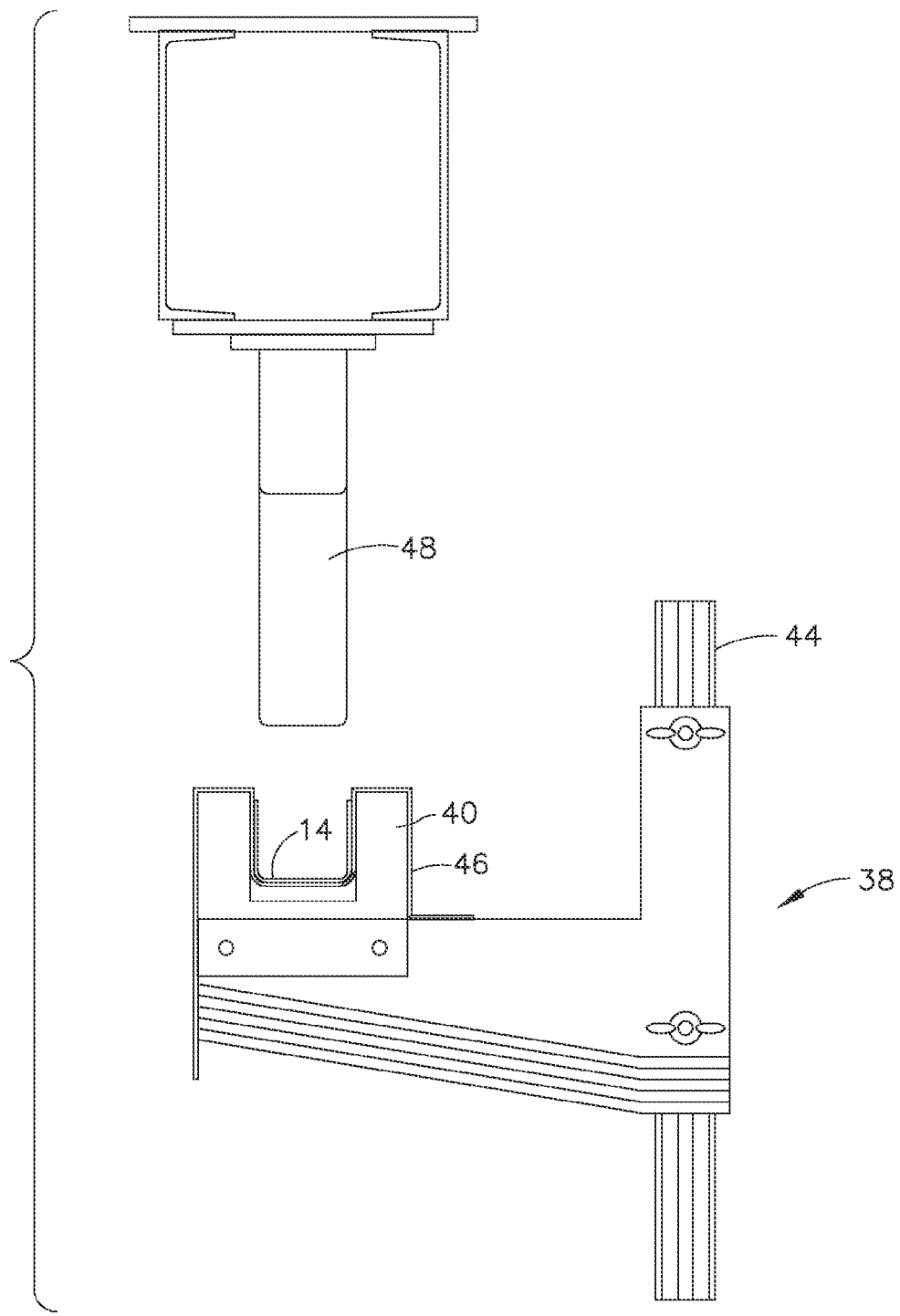
FIG. 7 is an end view of the inverted cure mandrel in position for mating with the formed composite laminate assembly.
Figure 8:
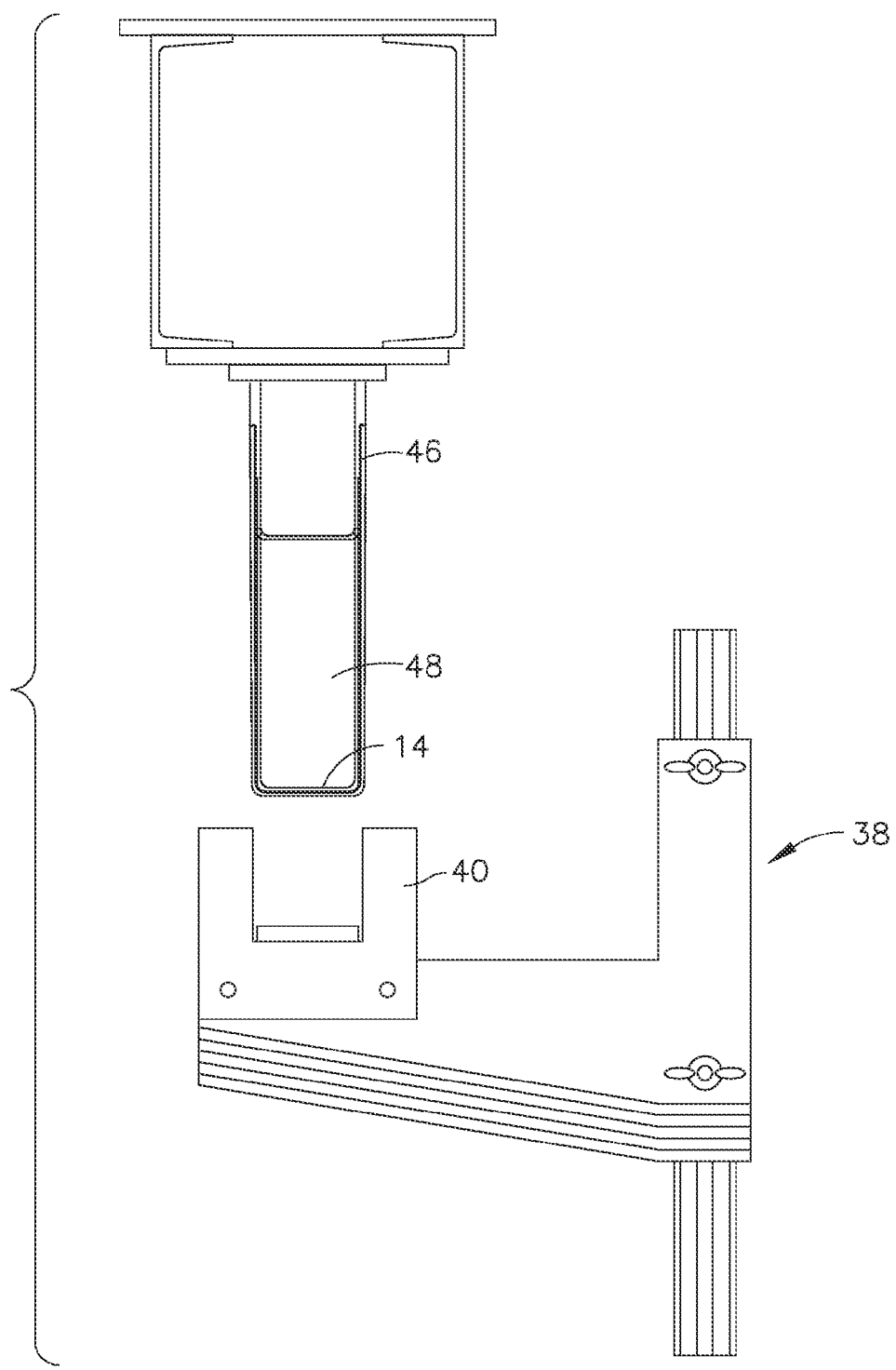
FIG. 8 is an end view of the inverted cure mandrel with the formed composite laminate assembly in place.
Figure 9:
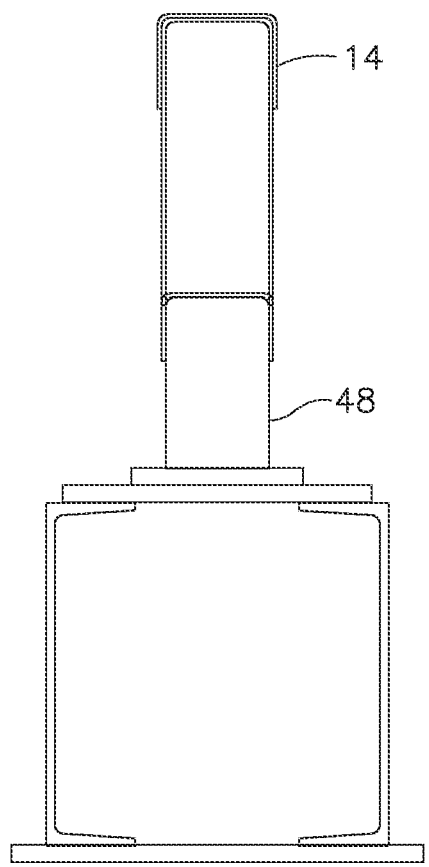
FIG. 9 is an end view of the cure mandrel with the cured composite laminate assembly.

FIG. 6 shows a transfer tool 38 which is inserted under the mandrel support tooling to received the formed composite laminate assembly 14. For the embodiment shown, the transfer tool 38 employs multiple adjustable headers 40 which for the embodiment shown correspond to the segments in the mandrel, supported by arms 42 extending from vertical support elements 44. Lashing material 46 is laid in the headers to receive the composite laminate assembly. The composite laminate assembly 14 is released from the mandrel 10 by releasing the vacuum on the Elastomeric sheet 29. The mandrel and associated support structure and the transfer tool are then separated and a cure mandrel 48 is inverted over the supported composite laminate assembly as shown in FIG. 7. The cure mandrel 48 has a profile adapted to receive the formed composite laminate assembly and is lowered into contact with the composite laminate assembly 14. The lashing 46 is then attached to the cure mandrel 48 to support the composite laminate assembly 14 and the cure mandrel is then lifted away from the support structure carrying the composite laminate assembly as shown in FIG. 8. The cure mandrel 48 is then rotated to support the composite laminate assembly 14, the lashings 46 removed and the mandrel and composite laminate assembly are inserted into an autoclave or other heating element for cure of the composite laminate assembly. A completed part for the wing rib cord is shown in FIG. 10. For the embodiment shown, a single composite laminate assembly 14 is employed to mold symmetrically identical parts with the previously described part line 25 to separate the right hand and left hand elements.

Figure 11A:
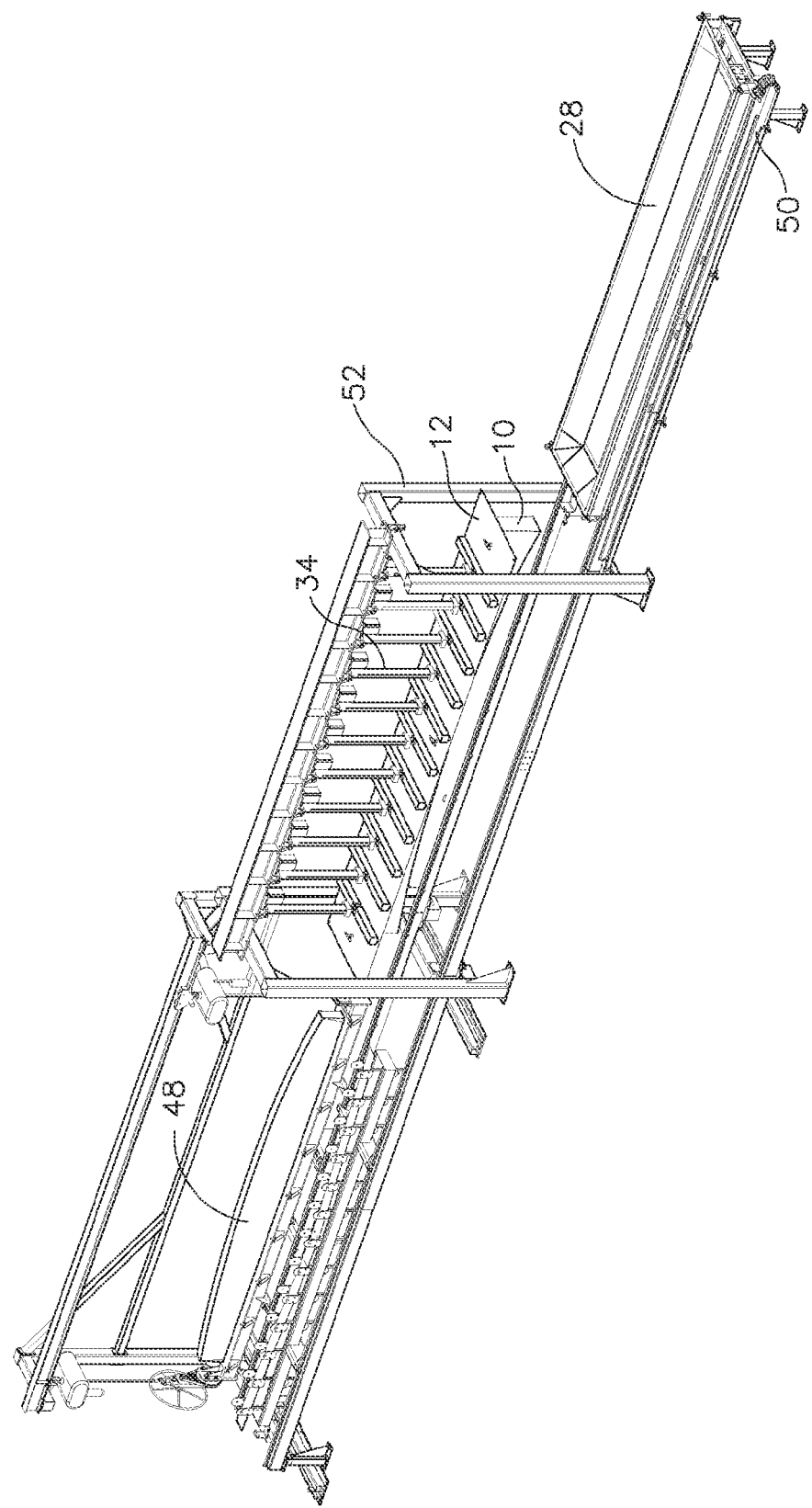
FIG. 11A is an isometric layout of an exemplary tooling line for performing the exemplary method.

The method and tooling described is readily adaptable for high rate production employing a line as shown in FIG. 11A. Tray 28 is roller mounted on rails 50. A flat pre-preg composite laminate assembly is prepared, indexed and loaded in the tray 28 on top of an elastomeric sheet as previously described. The tray 28 is placed on in-feed table. The pre-preg composite laminate assembly is heated to forming temperature; for the exemplary embodiment approximately 130 degrees F. The tray 28 is moved along the rails 50 into position under the spline plate 12 which is supported by its actuators 34 from a vertical frame 52. The actuators 34 lower the spline plate 12 to the top of the tray 28. With the tray sealed to the spline plate, vacuum is applied to the cavity. This pulls the elastomeric sheet 29 and pre-preg composite laminate assembly 14 up to the segmented forming mandrel 10. The composite laminate assembly wraps around the thrilling segments, creating a channel shape. The loading tray 28 is removed to its original position.

The actuators 34 lift the spline plate 12, composite laminate assembly 14, and elastomeric sheet 29 out of the tray. While still under vacuum, the actuators 34 move to programmed positions to curve the spline plate 12 and channel composite laminate assembly 14. While the formed composite laminate assembly cools, a shuttle fable with the transfer tool 38 with matching headers slides into position underneath the composite laminate assembly 14 and supports are lifted up to support the formed composite laminate assembly. The vacuum is released, allowing the composite laminate assembly 14 to be fully supported by the shuttle fable carrying the transfer tool 38. The shuttle table moves the formed composite laminate assembly toward the cure tool manipulator.

The cure tool 48 in an inverted attitude, is lowered to mate with the formed composite laminate assembly 14. After the cure tool 48 is seated into the formed composite laminate assembly, the formed composite laminate assembly and elastomer sheet are lashed to the cure tool. The cure tool 48 and formed composite laminate assembly 14 are lifted out of the transfer tool 38 and the cure tool is rotated to the upright position. The lashing and elastomeric sheet are removed leaving the formed composite laminate assembly on the cure tool. The cure tool is removed from the cell. The formed composite laminate assembly is vacuum bagged to the cure tool and sent to an autoclave for cure. While not shown in the drawings, if timing of cure and previously noted processes are approximately equivalent, the autoclave can be located on an extension of the rails allowing the cure tool supports to be rail mounted to move the tool and bagged composite laminate assembly directly into the autoclave.

Figure 11B:
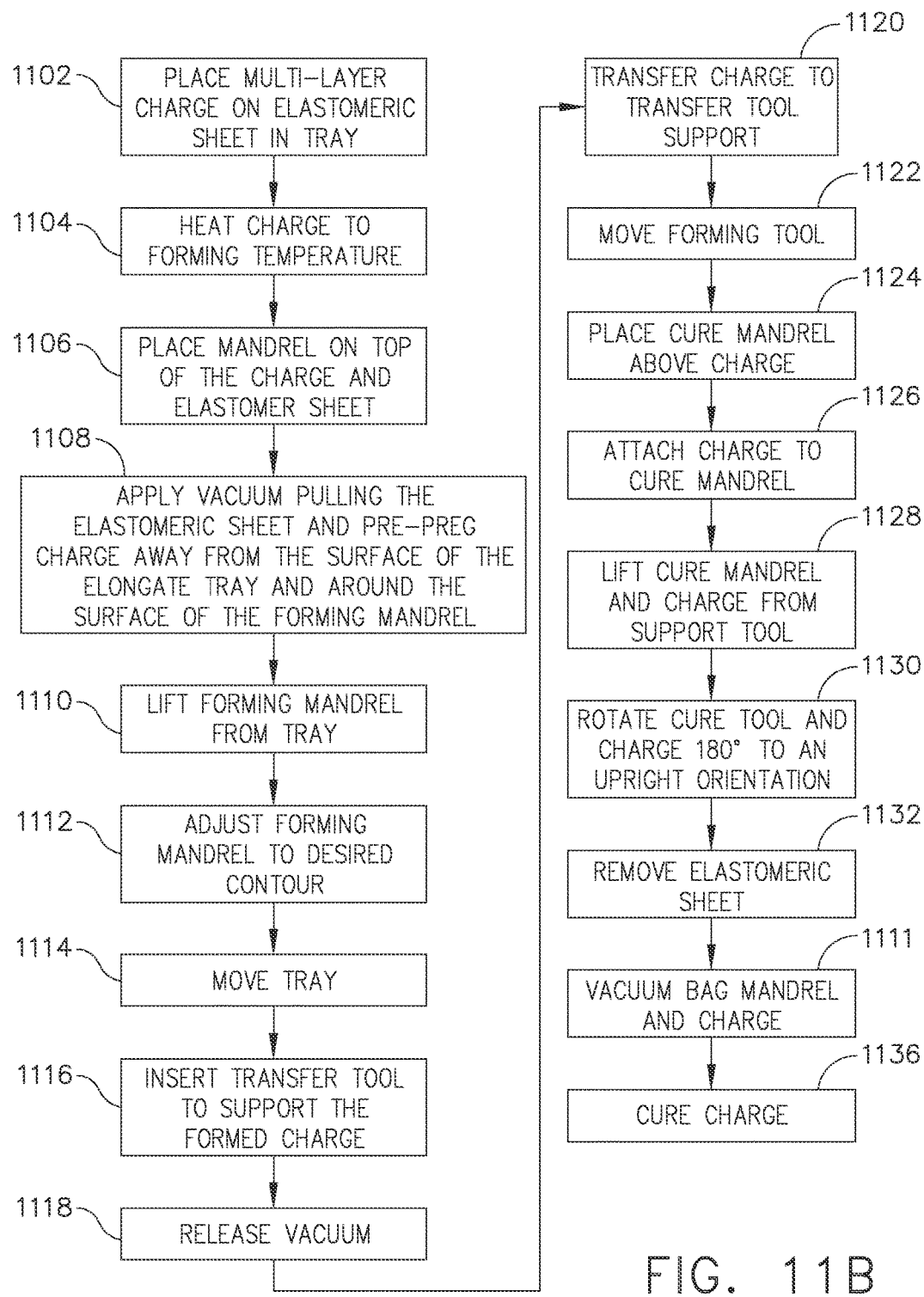
FIG. 11B is a flow chart for an exemplary manufacturing flow employing the tooling line of FIG. 11A for part forming.

An embodiment of the process employing the tooling system of FIG. 11A is described in FIG. 11B. The process is initiated by placing a multi-layer charge of pre-preg material on an elastomeric sheet which lines the sides and bottom of an elongate tray that has vertical side and end walls in step 1102. The elongate tray rests on a horizontal and flat table. The charge is heated to a forming temperature of approximately 130 degrees F. in step 1104. A flexible forming mandrel is placed with a neutral bending axis on its upper surface on top of the charge such that a sealed chamber is created between the mandrel and the elastomer-lined elongate tray in step 1106. A vacuum is applied in the sealed chamber in step 1108 thus pulling the elastomeric sheet and pre-preg charge away from the surface of the elongate tray and around the surface of the forming mandrel. The forming mandrel is lifted from the elongate tray in step 1110 and the forming mandrel is adjusted to the desired contour in the lengthwise direction while said vacuum is still applied to the elastomeric sheet and composite charge in step 1112. The elongate tray is moved from under the formed charge and mandrel assembly in step 1114 and replaced with a transfer tool to support the formed charge in step 1116. The vacuum is then released between the charge and the forming mandrel in step 1118 and the charge is transferred to the transfer tool support in step 1120. The forming tool is then moved from above the supported charge in step 1122 and a cure mandrel is placed above the supported charge in step 11244. The charge is then attached to the cure mandrel in step 1126, the cure mandrel and charge are lifted from the support tool in step 1128 and the cure tool and charge are rotated one hundred and eighty degrees to an upright orientation in step 1130. The elastomeric sheet is then removed in step 1132 and the mandrel and charge are vacuum bagged in the normal manner in step 1134. The charge is then cured in an autoclave in step 1136.

Figure 13:
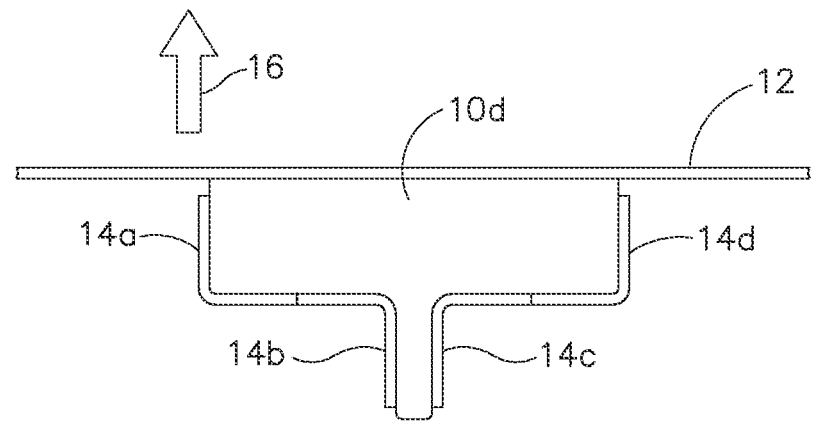
FIG. 13 is an end view showing a composite laminate assembly layup for the composite structural assembly of FIGS. 12A and B.

Alternative embodiments for the tooling a process described provide for various structural element shapes and contours with the ability to create symmetrical structural pairs. FIG. 12A shows a second exemplary structural member, a Tee rib 60. The Tee rib is formed from mated inversely symmetrical elements a conventional cord 62 and an inverted cord 64. As shown in FIG. 12B, the conventional and inverted cords are joined on one leg and for the embodiment shown, the radius gap is filled with a composite tape pre-formed into a triangular cross-section called a noodle 66. As shown in FIG. 13, the tooling previously described is adaptable for fabrication of mating elements such as the Tee Rib. Individual flat composite laminate assembly layups or single layups with part lines are formed to mandrel 10 by evacuating elastomeric bagging materials as previously described to provide draping of the composite laminate assembly elements 14a, 14b, 14c and 14d. Contouring of spline plate 12 then simultaneously forms conventional and inverted cord pair 14a and 14c as well as the opposite hand conventional and inverted cord pair 14b and 14d. Up to four chord angles are made at one time with this mandrel arrangement. Diagonally opposite angles are combined into tees. The forming block segments 10d of the mandrel are tall and wide to accommodate the multiple part elements.

Figure 14:
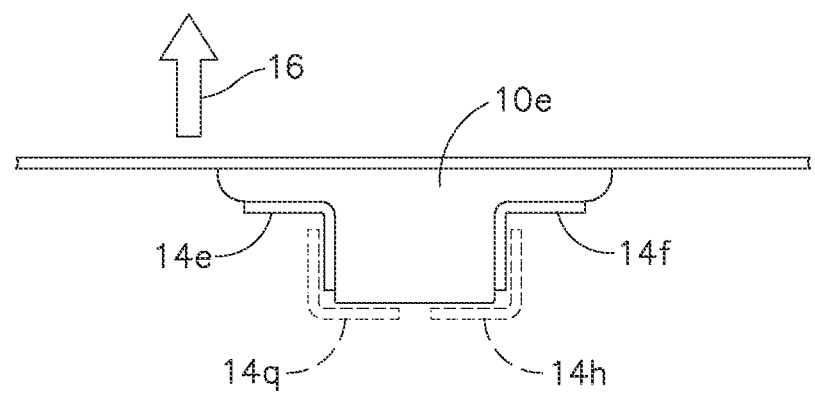
FIG. 14 is an end view of a first alternative composite laminate assembly layup for the composite structural assembly of FIGS. 12A and B.
Figure 15:
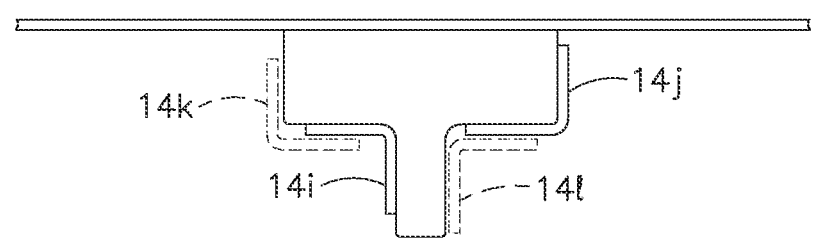
FIG. 15 is an end view of a second alternative composite laminate assembly layup for the composite structural assembly of FIGS. 12A and B.

FIG. 14 shows an alternative mandrel and composite laminate assembly arrangement making two chord angles one at a time. This configuration produces a left hand and right hand pair of either conventional (14e and 14f), or inverted (14g and 14h) chord angles. The segmented mandrel employs low profile forming blocks 10e. Similarly, FIG. 15 shows a second alternative making two chord angles 14i and 14j or 14k and 14l at one time to be assembled into one tee chord. While similar in arrangement to the forming blocks of FIG. 13, forming blocks 10f in FIG. 15 do not require as much width since individual pairs are formed separately.

Figure 16:
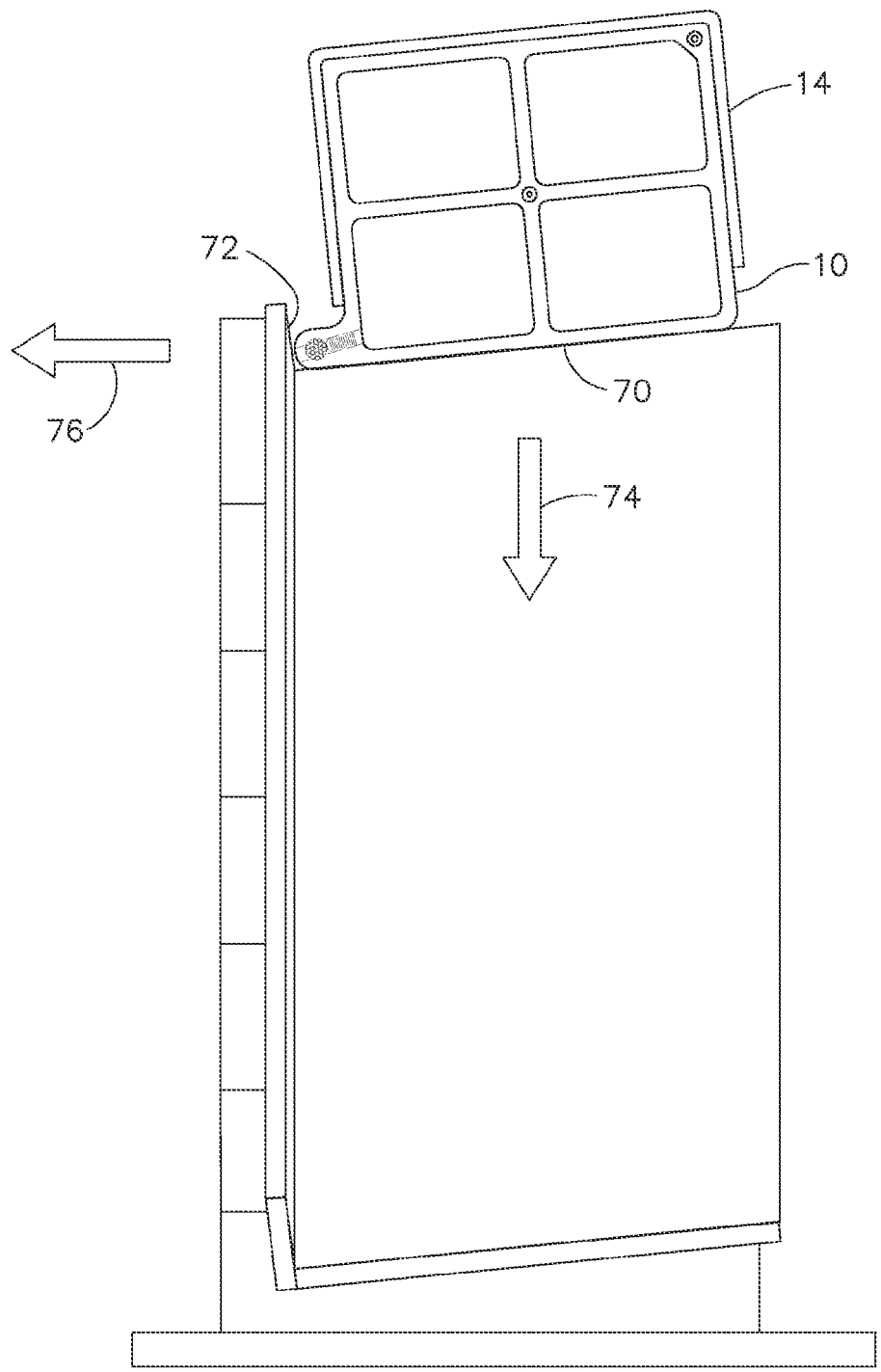
FIG. 16 is an end view of a second embodiment of a flexible mandrel and support tooling arrangement for forming a multiple axis of curvature.
Figure 17:
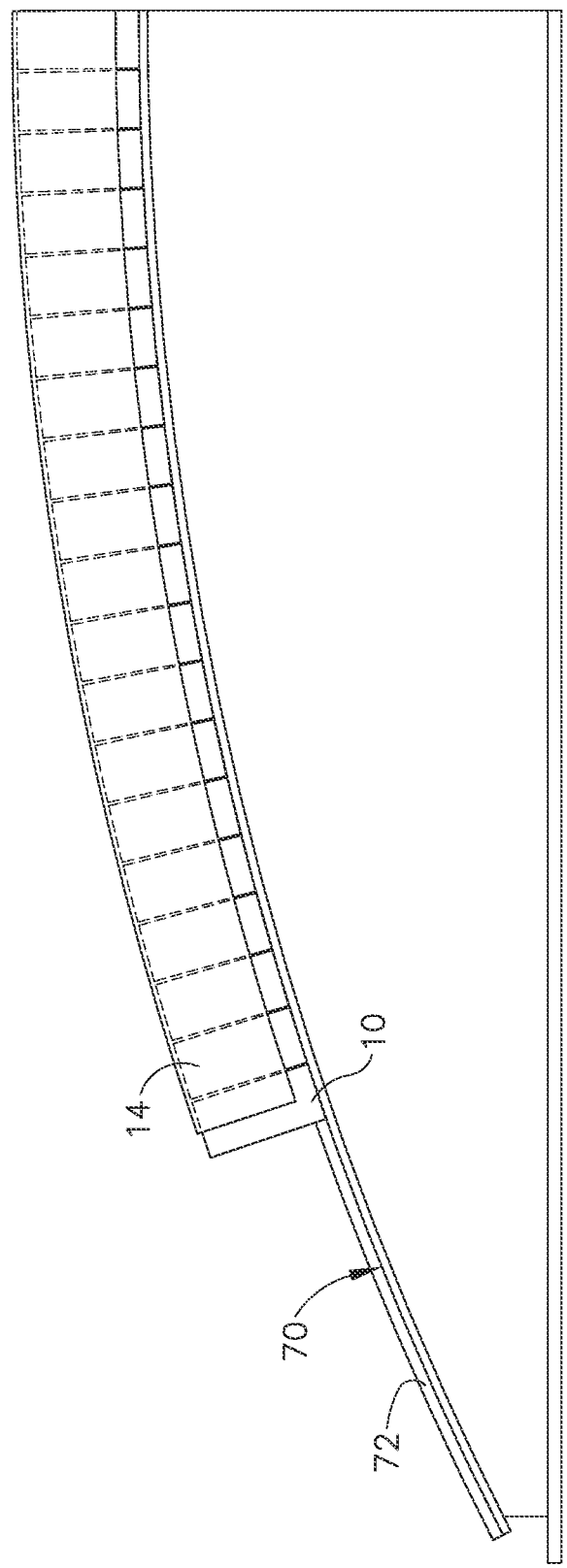
FIG. 17 is a side view of the second embodiment of a flexible mandrel and support tooling arrangement for forming a multiple axis of curvature.
Figure 18:
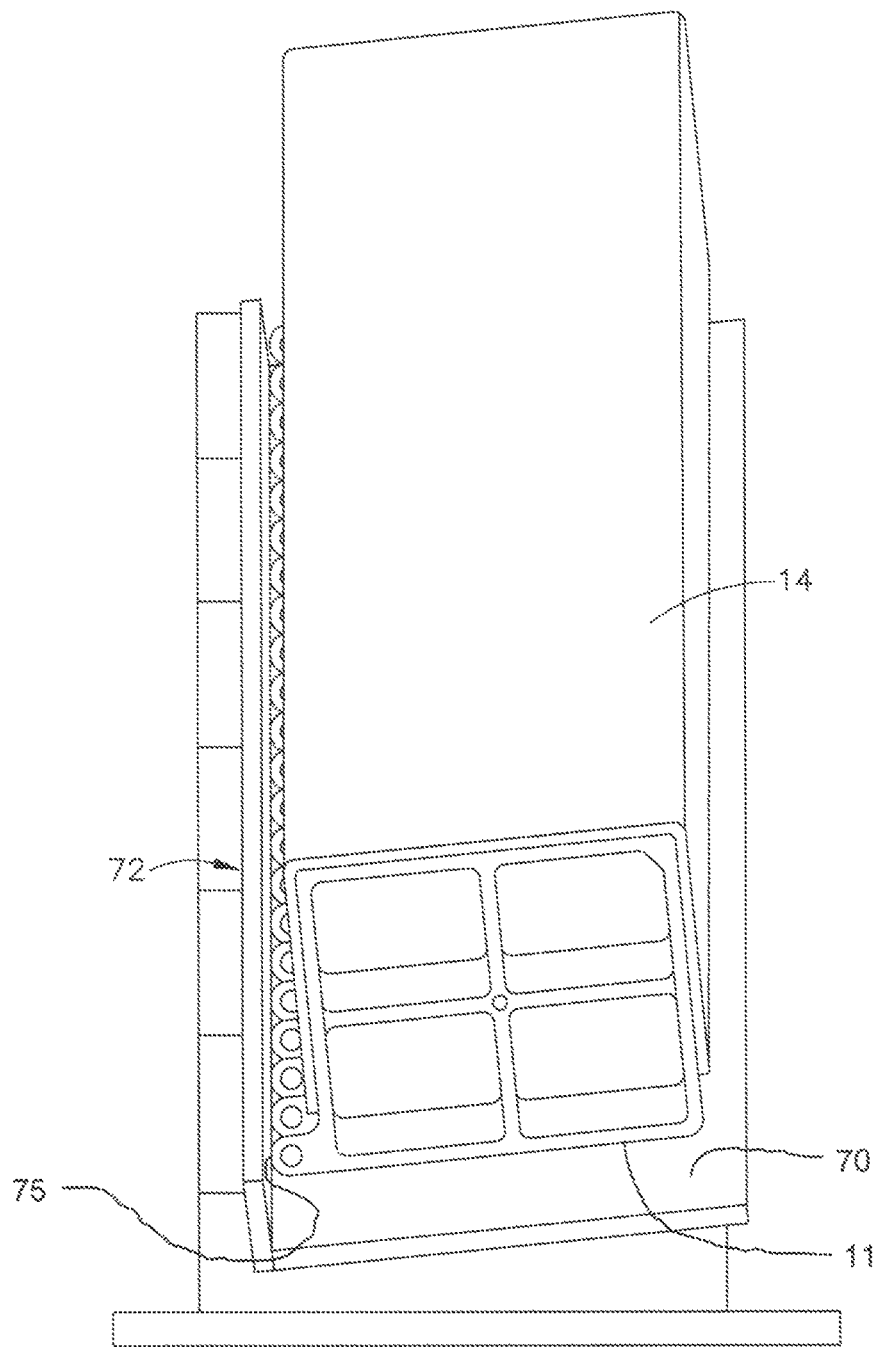
FIG. 18 is an isometric view of the second embodiment.
Figure 19:
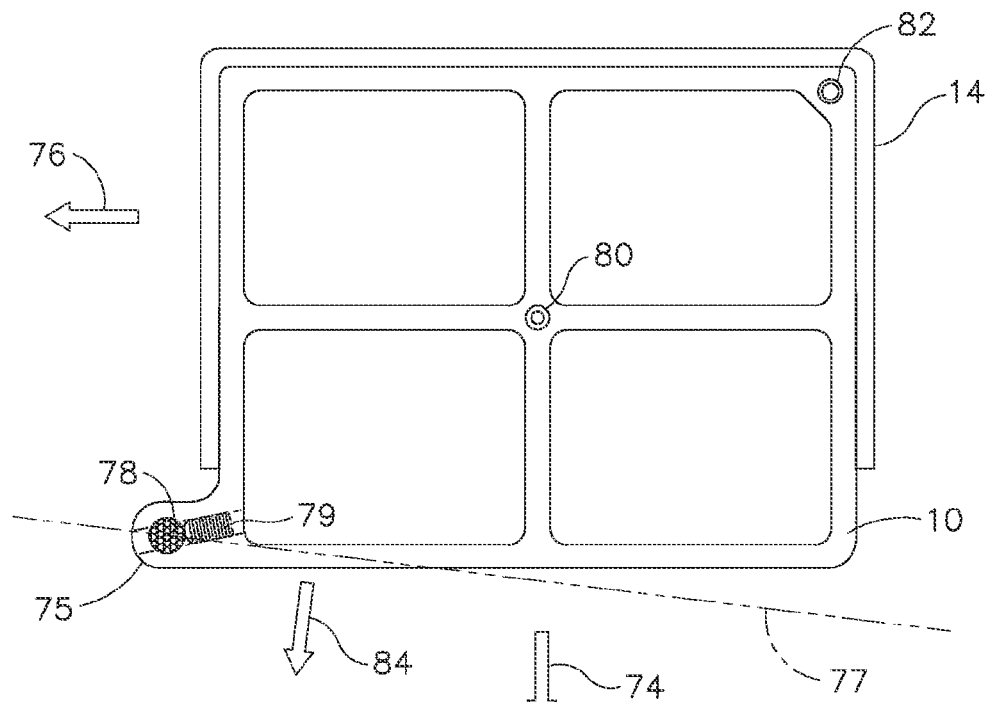
FIG. 19 is a detailed view of the flexible mandrel elements for the second embodiment; and, FIG. 20 is an exemplary formed structural part from the second embodiment tooling.

The present method is also applicable to composite structural members having a complex center of curvature. As shown in FIGS. 16, 17 and 18, spline plates 70 and 72 which are curved with differing centers of curvature reflected by arrows 74 and 76 respectively are incorporated in a saddle as the supporting structure for the shaping surface of the flexible mandrel forming block segments best seen in FIG. 19. The curvature of spline plate 70 on the saddle is exaggerated for clarity. One shaping surface 11 of the forming blocks engages one spline plate 70 while a second shaping surface engages the second spline plate 72. The second shaping surface is provided in the embodiment shown by protuberances 75 to provide offset for the neutral axis of the mandrel relative to the second center of curvature to assure that the draped composite laminate assembly is maintained in tension at all locations. The mandrel forming blocks are connected along a neutral axis 77 for the forming curvature with a steel cable 78 having minimal stretch but lateral flexibility. For the embodiment shown, a set screw 79 in each segment forming block prevents movement of the block along the cable. A straightening cable 80 located central to the forming blocks employs tensioning fasteners at its ends to draw the segments together for initial draping of the flat composite laminate assembly over the mandrel and is relaxable by releasing the tension on the fasteners. Alignment pins 82 located diametrically opposed with respect to the straightening cable from rigid cable 78 maintain relative alignment of the opposing corners of the mandrel segments while allowing expansion of the segments upon relaxing of the straightening cable. For the embodiment shown, discontinuous zero plies are employed with full envelope vacuum bagging to form the composite laminate assembly to the mandrel as described for previous embodiments.

Once the composite laminate assembly is draped on the mandrel, the straightening cable tension is released and the mandrel relaxes onto the saddle spline plates in two directions providing a resultant center of curvature perpendicular to the neutral axis as represented by directional arrow 84. The mandrel is flexed over the saddle tool while under heat and vacuum. The composite laminate assembly is allowed to cool and then removed from flex mandrel and placed on a rigid cure mandrel for curing as previously described.

Figure 20:
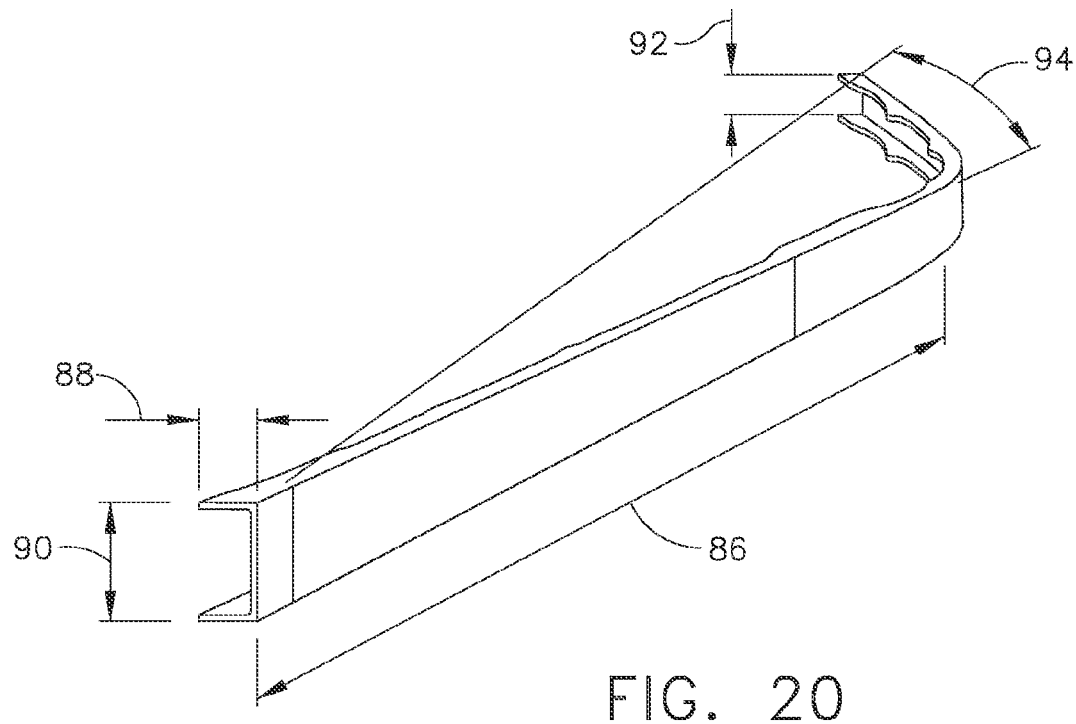

The resulting part with multidimensional curvature, an outboard spar, is shown in FIG. 20. As exemplary of the capability of the tooling and method disclosed herein the outboard spar is approximately 131 inches in overall length 86 with a 4.5 inch flange width 88 and an inside channel width varying from an inboard end 90 of 6.6 inches to and outboard end 92 of 4.5 inches. A 13 inch cord height 94 can be obtained with the tooling and method described.

Figure 21:
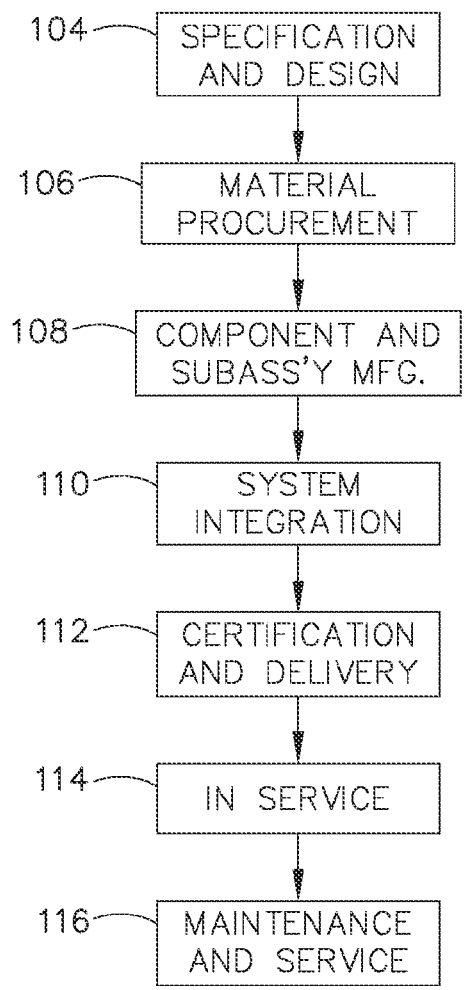
FIG. 21 is a flow diagram of aircraft production and service methodology.
Figure 22:
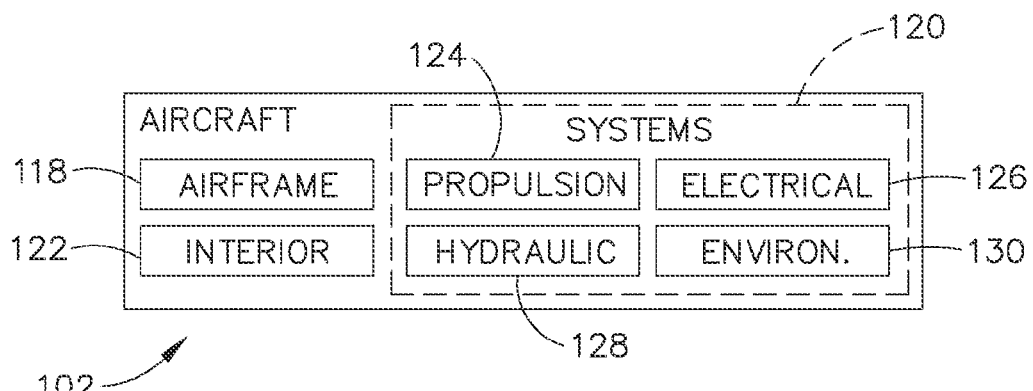
FIG. 22 is a block diagram of an aircraft.

The embodiments disclosed herein may be described in the context of an aircraft manufacturing and service method 100 as shown in FIG. 21 and an aircraft 102 as shown in FIG. 22. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 22, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the embodiments disclosed herein may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Having now described exemplary embodiments in detail as required by the patent statutes, those skilled in the art will recognize modifications and substitutions to the specific embodiments disclosed herein. Such modifications are within the scope and intent of the present invention as defined in the following claims.

What is claimed is:

1. A method for forming of pre-preg structural members comprising the steps of:
providing a mandrel having a plurality of forming blocks in segments, said forming blocks sized to receive a draped composite laminate assembly;
draping the composite laminate assembly on the mandrel maintaining all portions of the composite laminate assembly spaced from at least one shaping surface on each block during draping;
providing a saddle with at least one spline plate;

mounting the mandrel on the saddle;

maintaining the draped composite laminate assembly in contact with the forming blocks; and, relaxing the shaping surfaces of the forming blocks onto the at least one spline plate, the forming blocks conforming to a curvature of the at least one spline plate to maintain the composite laminate assembly in tension.

2. The method defined in claim 1 further comprising the step of providing a second spline plate as a portion of the saddle with a second center of curvature and said step of relaxing the mandrel form blocks includes relaxing second shaping surfaces of the forming blocks onto the second spline plate.

3. The method defined in claim 1 wherein the step of providing a mandrel includes tensioning a cable in the forming blocks to draw the forming blocks together in a first tensioned position and the step of relaxing the mandrel comprises releasing the tension on the cable.

4. The method defined in claim 2 further comprising restraining the forming blocks at a neutral axis prior to draping the composite laminate assembly on the mandrel.

5. The method defined in claim 4 wherein the neutral axis is offset to maintain the draped composite laminate assembly in tension.

6. The method as defined in claim 1 wherein the step of maintaining the draped composite laminate assembly in contact with the forming blocks comprises:

providing a vacuum bag surrounding the composite laminate assembly; and drawing vacuum on the vacuum bag to form the composite laminate assembly around the forming blocks.

7. A method for multiple axis forming of pre-preg structural members comprising the steps of:

providing a mandrel having a plurality of forming blocks in segments, said forming blocks sized to receive a draped composite laminate assembly;

restraining the forming blocks at a neutral axis;

tensioning a cable in the forming blocks to draw the forming blocks together in a first tensioned position;

draping a composite laminate assembly on the mandrel maintaining all portions of the composite laminate assembly spaced from a first shaping surface and a second shaping surface on each block during draping;

providing a vacuum bag surrounding the composite laminate assembly;

drawing vacuum on the vacuum bag to form the composite laminate assembly around the forming blocks;

providing a saddle with a first spline plate and a second spline plate:

mounting the mandrel on the saddle;

maintaining the draped composite laminate assembly in contact with the forming blocks; and, releasing the tension on the cable and relaxing the first shaping surface of each of the forming blocks onto the first spline plate and the second shaping surface of each of the forming blocks onto the second spline plate, the forming blocks conforming to a curvature of the first spline plate and conforming to a curvature of the second spline plate to maintain the composite laminate assembly in tension.

\* \* \* \* \*